Patented Apr. 4, 1944

2,346,049

UNITED STATES PATENT OFFICE 2,346,049

METHOD OF PRODUCING DIALKOXY STILBENES

Ewald Rohrmann, Indianapolis, Ind., assignor to Eli Lilly and Company, Indianapolis, Ind., a corporation of Indiana No Drawing. Application February 13, 1941, Serial No. 378,776

13 Claims. (Cl. 260—613)

This invention relates to stilbenes and more particularly to methods of producing dialkoxy stilbenes.

Many stilbenes possess marked estrogenic activity, but the "trans" forms of the stilbenes having this activity have been found to have substantially more estrogenic activity than the "cis" forms. For example, the "trans" form of 4:4'-dihydroxy-$\alpha$:$\beta$-diethyl stilbene, known as stilbestrol, has about ten times the activity of the "cis" form of 4:4'-dihydroxy-$\alpha$:$\beta$-diethyl stilbene. In the preparation of these estrogenically active stilbenes synthetically, approximately equal quantities of the "trans" and "cis" forms are produced and various methods have been proposed for separating the "trans" from the "cis" form. The methods now in use for this separation utilize differences in physical properties between the "trans" and the "cis" form. These methods, however, involve considerable manipulation and produce but fair yields.

In accordance with this invention the "trans" form of the dialkoxy derivative of the desired stilbene is produced in good yields quickly and efficiently. These dialkoxy stilbene derivatives can be readily converted to the desired stilbene.

The method in accordance with this invention is as follows:

Iodine is reacted with a composition represented by the following formula:

(1) 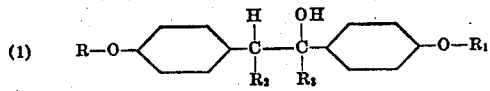

in which R is a radical selected from the class consisting of alkyl radicals, alkaryl radicals, acyl radicals, aracyl radicals, substituted chloroacyl radicals, substituted bromoacyl radicals, and substituted aracyl radicals in which the substituent is selected from the class consisting of the halogens and nitro groups, $R_1$ is a radical selected from the class consisting of alkyl radicals, alkaryl radicals, acyl radicals, aracyl radicals, substituted chloroacyl radicals, substituted bromoacyl radicals, and substituted aracyl radicals in which the substituent is selected from the class consisting of the halogens and nitro groups, $R_2$ is a member selected from the class consisting of hydrogen, alkyl radicals, alkenyl radicals, aryl radicals, alkaryl radicals, cycloalkyl radicals, cycloalkenyl radicals, and substituted alkyl, aryl, alkaryl, and cycloalkyl radicals containing at least one substituent selected from the class consisting of chlorine, bromine, alkoxy groups and amino groups and substituted alkenyl and cycloalkenyl radicals containing at least one substituent selected from the class consisting of alkoxy groups and amino groups, and $R_3$ is a member selected from the class consisting of hydrogen, alkyl radicals, alkenyl radicals, aryl radicals, alkaryl radicals, cycloalkyl radicals, cycloalkenyl radicals and substituted alkyl, aryl, alkaryl, and cycloalkyl radicals containing at least one substituent selected from the class consisting of chlorine, bromine, alkoxy groups and amino groups and substituted alkenyl and cycloalkenyl radicals containing at least one substituent selected from the class consisting of alkoxy groups and amino groups. Preferably, the quantity of iodine employed is between .05 and .3 percent by weight of the quantity of the composition treated. The reaction is conducted between 40° C. and 200° C. and, desirably, this temperature is maintained between 70° C. and 140° C. The reaction which takes place may be represented by the following equation:

(2) 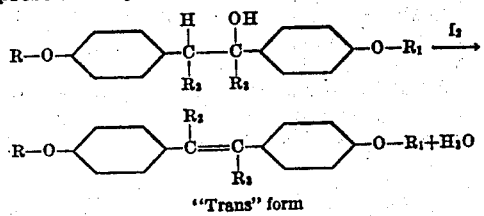

"Trans" form

Preferably, when either or both R and $R_1$ are alkyl radicals, acyl radicals, substituted chloroacyl radicals, or substituted bromoacyl radicals, the number of carbon atoms of each alkyl, acyl, substituted chloroacyl or substituted bromoacyl radical does not exceed three and, preferably, when either or both R and $R_1$ are alkaryl radicals, aracyl radicals or substituted aracyl radicals, each alkaryl, aracyl, or substituted aracyl radical is the benzyl, benzoyl, or substituted benzoyl radical respectively. For example, desirably, either or both $R_1$ and $R_2$ are the methyl, ethyl, propyl, isopropyl, acetyl, propionyl, bromoacetyl, $\alpha$- or $\beta$-chloropropionyl, o-chlorobenzoyl or p-nitrobenzoyl radicals. However, either or both R and $R_1$ may be other alkyl, acyl, chloroacyl, or bromoacyl radicals, such as the n-butyl, isoamyl, decyl, capryl, or $\alpha$-chlorobutyryl radical. Likewise, either or both R and $R_1$ may be alkaryl, aracyl, or substituted aracyl radicals other than the benzyl, benzoyl, or substituted benzoyl radical, such as $\beta$-phenethyl

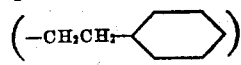

mesityl

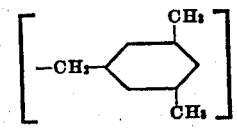

phenylacetyl or p-chlorophenylpropionyl.

When either or both $R_2$ and $R_3$ are alkyl, alkenyl, cycloalkyl, or cycloalkenyl radicals or substituted alkyl, alkenyl, cycloalkyl, or cycloalkenyl radicals, each of these radicals preferably contains less than eight carbon atoms. Examples of such radicals are propyl, n-amyl, methallyl

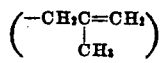

allyl (—CH₂CH=CH₂), cyclopentyl, cyclohexyl, cyclopentenyl

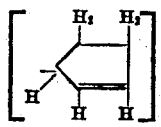

cyclohexenyl

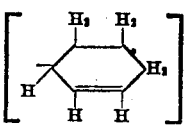

2,3-dichloro-n-butyl, -aminoallyl

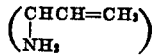

and 4-methoxycyclohexyl.

When either or both R₂ and R₃ are aryl or alkaryl radicals or substituted aryl or alkaryl radicals, each of these radicals preferably contains less than eight carbon atoms. Examples of such radicals are phenyl, o-tolyl, benzyl, p-chlorophenyl, m-methoxyphenyl, o-aminophenyl, p-chlorobenzyl and p-methoxybenzyl.

When R₃ in the composition treated is hydrogen, the period of heating is from 12 to 36 hours, while when R₃ is any of the radicals defined the period of heating is preferably between 6 and 18 hours. Substantially all of the reaction product formed is in the "trans" form. The "trans" form of the dialkoxy stilbene is separated from the iodine by any suitable means, such as solution in a suitable solvent and subsequent filtration through decolorizing carbon. If desired, the iodine may be removed by dissolving the reaction product in a suitable solvent, such as ether, and agitating with a water solution of sodium thiosulfate.

Alternately, the "cis" form of a dialkoxy stilbene may be converted into the "trans" form by reacting the "cis" form of the dialkoxy stilbene with iodine. In this case the quantity of iodine employed is preferably between .05 and .3 percent by weight of the quantity of the composition in the "cis" form which is treated. The period of heating and the procedure followed are the same as those in the formation of the dialkoxy stilbene from the composition represented in Formula 1. R, R₁, R₂, and R₃ are preferably of low molecular weight as heretofore described for the composition represented in Formula 1. The reaction which takes place in the conversion of the "cis" form to the "trans" form may be represented by the following equation:

(3)

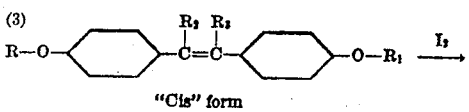

"Cis" form

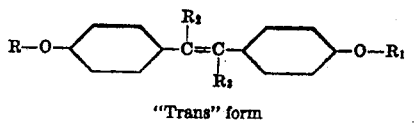

"Trans" form

In the preparation of the "trans" form of the dialkoxy stilbene from either the composition represented structurally in Formula 1 or from the "cis" form of a dialkoxy stilbene, the reaction with iodine may be conducted with or without the use of a suitable solvent which does not react with the reactants or the resulting product. If a solvent is employed, its selection may be determined by the solubility of the reacting ingredients in it as well as the temperature at which the reaction is to be conducted. Examples of solvents which may be used are: benzene, toluene, xylene, pyridine, nitrobenzene, o-, p-, or m-methylcyclohexane and mixtures of these materials.

Typical examples of the methods of this invention are as follows:

EXAMPLE 1.—*Preparation of the "trans" form of 4:4'-dimethoxy-α:β-diethyl stilbene*

To 200 g. of 3:4-di-(p-methoxyphenyl)-hexane-3-ol, which has been melted on the steam bath, are added 400 mg. of iodine crystals. The mixture is shaken to dissolve the iodine and heated on the steam bath for about 12 hours. Crystalline material soon separates out. After 12 hours the material is a solid crystalline mass at steam bath temperature. During this time the "trans" form of 4:4'-dimethoxy-α:β-diethyl stilbene is formed. The solid, which contains the "trans" form of 4:4'-dimethoxy-α:β-diethyl stilbene, is dissolved in 500 cc. of chloroform and this solution is diluted with 500 cc. of acetone. The solution, which contains the "trans" form of 4:4-dimethoxy-α:β-diethyl stilbene, is treated with decolorizing carbon and filtered. The filtrate, which is a solution of the desired product, is evaporated to a volume of about 400 cc. and 500–700 cc. of petroleum ether (B. P. 30°–60° C.) are added. The mixture is cooled to a temperature of about —10° C. White crystals, which is the "trans" form of 4:4'-dimethoxy-α:β-diethyl stilbene, separate out and these crystals are washed with a mixture of 10 parts petroleum ether (B. P. 30°–60° C.) and 1 part ether and dried in the air oven at 50° C. The resulting white crystals have a melting point of 122°–124° C., uncorrected, and may be represented by the following formula:

(4)

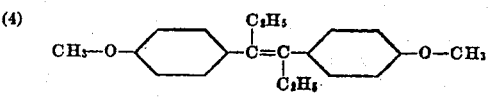

EXAMPLE 2.—*Preparation of the "trans" form of 4:4'-dimethoxy-α-ethyl stilbene*

To 50 g. of 1:2-di-(p-methoxyphenyl)-butane-2-ol melted on the steam bath are added 100 mg. of iodine. The mixture is heated at 95°–100° C. for 18 hours. The reaction product is dissolved in acetone, and treated with decolorizing carbon. The product is crystallized from a mixture of 1 part of acetone and 5 parts of petroleum ether (B. P. 30°–60° C.) to give white crystals of the "trans" form of 4:4'-dimethoxy-α-ethyl stilbene. This product has a melting point of 84°–87° C., uncorrected, and may be represented by the following formula:

(5)

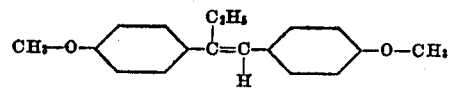

EXAMPLE 3.—*Preparation of the "trans" form of 4:4'-dimethoxy-α:β-dimethyl stilbene*

To 30 g. of 2:3-di-(p-methoxyphenyl)-butane 3-ol melted on the steam bath are added 60 mg. of iodine. The mixture is heated on the steam bath for a period of 12 hours. The solid crystalline mass is dissolved in acetone, treated with decolorizing carbon and crystallized from 1:5 acetone-petroleum ether (B. P. 30°–60° C.) as white crystals of the "trans" form of 4:4'-dimethoxy-α:β-dimethyl stilbene. This product has a melting point of 126°–128° C., uncorrected, and may be represented by the following formula:

(6)
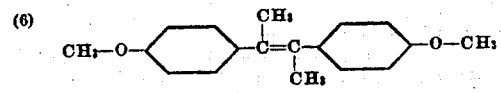

EXAMPLE 4.—*Preparation of the "trans" form of 4:4'-dimethoxy-α-phenyl stilbene*

To 20 g. of 1:2-di-(p-methoxyphenyl)-1-phenylethane-1-ol are added 60 mg. of iodine. The mixture is heated at 120° C. for approximately 12 hours. The reaction product is dissolved in acetone, treated with decolorizing carbon and crystallized from 1:5 acetone-petroleum ether (B. P. 30°–60° C.) to give white crystals of the "trans" form of 4:4'-dimethoxy-α-phenyl stilbene. This product has a melting point of 105°–107° C., uncorrected, and may be represented by the following formula:

(7)
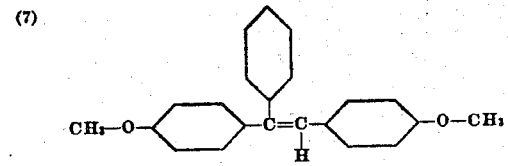

EXAMPLE 5.—*Preparation of the "trans" form of 4:4'-dimethoxy stilbene*

To 10 g. of 1:2-di-(p-methoxyphenyl)-ethane-1-ol are added 40 mg. of iodine. The mixture is heated at 140° C. for approximately 12 hours. The reaction product is dissolved in acetone, treated with decolorizing carbon and crystallized from 1:5 acetone-petroleum ether (B. P. 30°–60° C.) to give white crystals of "trans" form of 4:4'-dimethoxy stilbene. This product has a melting point of 210°–212° C., uncorrected, and may be represented by the following formula:

(8)
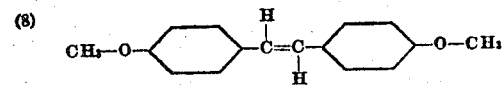

EXAMPLE 6.—*Preparation of the "trans" form of 4:4'-diethoxy stilbene*

To 10 g. of 1:2-di-(p-ethoxyphenyl)-ethane-1-ol are added 50 mg. of iodine. The mixture is heated at 150° C. for approximately 12 hours. The reaction product is dissolved in acetone, treated with decolorizing carbon and crystallized from 1:5 acetone-petroleum ether (B. P. 30°–60° C.) to give white crystals of the "trans" form of 4:4'-diethoxy stilbene. This product has a melting point of 208°–210° C., uncorrected, and may be represented by the following formula:

(9)
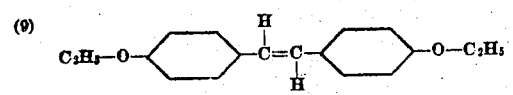

EXAMPLE 7.—*Preparation of the "trans" form of 4:4'-dimethoxy-α:β-diethyl stilbene*

To 100 g. of liquid cis-4:4'-dimethoxy-α:β-diethyl stilbene are added 100 mg. of iodine. The mixture is heated at 95°–100° C. for approximately 16 hours. The reaction product is dissolved in acetone, treated with decolorizing carbon and crystallized from 1:5 acetone-petroleum ether (B. P. 30°–60° C.) to give white crystals of trans-4:4'-dimethoxy-α:β-diethyl stilbene. The product has a melting point of 122°–124° C., uncorrected, and may be represented by the following formula:

(10)
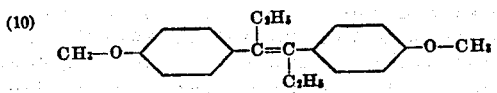

EXAMPLE 8.—*Preparation of the "trans" form of 4:4'-dimethoxy-α:β-diethyl stilbene*

To 200 g. of 3:4-di-(p-methoxyphenyl)-hexane-3-ol, heated at 95°–100° C., is added a solution of 400 mg. of iodine in 10 cc. of carbon tetrachloride. The resulting solution is heated at 95°–100° C. for 16 hours. The solid reaction product is crystallized from 1:5 acetone-petroleum ether (B. P. 30°–60° C.) to give white crystals of the "trans" form of 4:4'-dimethoxy-α:β-diethyl stilbene. This product has a melting point of 122°–124° C., uncorrected.

EXAMPLE 9.—*Preparation of the "trans" form of 4:4'-diacetoxy-α:β-diethyl stilbene*

To 10 g. of 3:4-di-(p-acetoxyphenyl)-hexane-3-ol, heated at 120° C., are added 25 mg. of iodine. After heating for 12 hours the reaction product is dissolved in acetone, treated with decolorizing carbon and crystallized from ethyl alcohol to give white crystals of trans-4:4'-diacetoxy-α:β-diethyl stilbene. The product has a melting point of 122°–124° C., uncorrected, and may be represented by the following formula:

(11)
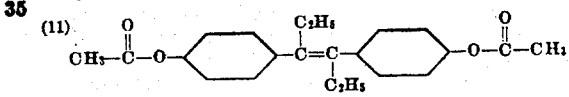

EXAMPLE 10.—*Preparation of the "trans" form of 4:4'-dibenzoyloxy-α:β-diethyl stilbene*

To 10 g. of 3:4-di-(p-benzoyloxyphenyl)-hexane-3-ol, heated at 130° C., are added 25 mg. of iodine. After heating for 8 hours the reaction product is dissolved in acetone, treated with decolorizing carbon and crystallized from 1:5 acetone-petroleum ether (B. P. 30°–60° C.) to give white crystals of trans-4:4'-dibenzoyloxy-α:β-diethyl stilbene. The product has a melting point of 209°–211° C., uncorrected, and may be represented by the following formula:

(12)
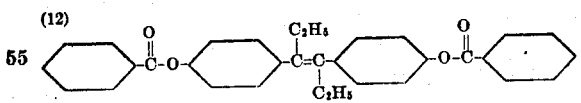

EXAMPLE 11.—*Preparation of the "trans" form of 4:4'-dimethoxy stilbene*

To a solution of 10 g. of 1:2-di-(p-methoxyphenyl)-ethane-1-ol in 100 cc. of dry xylene are added 30 mg. of iodine. The solution is refluxed for approximately 12 hours. The xylene is then distilled off at 30 mm. pressure and the residual reaction product is dissolved in acetone, treated with decolorizing carbon and crystallized from 1:5 acetone-petroleum ether (B. P. 30°–60° C.) to give white crystals of "trans" form of 4:4'-dimethyl stilbene. This product has a melting point of 210°–212° C., uncorrected.

What is claimed is:

1. The method of producing a disubstituted stilbene of predominantly "trans" form, which comprises subjecting to the presence of iodine a composition represented by the following formula:

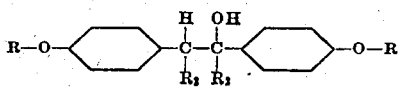

in which R in each case is a radical selected from the class consisting of alkyl radicals, aliphatic carboxylic acyl radicals, and aracyl radicals, and R₂ in each case is an alkyl radical.

2. The method of producing a disubstituted stilbene of predominantly "trans" form, which comprises subjecting to the presence of iodine, at a temperature between 40° C. and 200° C., a composition represented by the following formula:

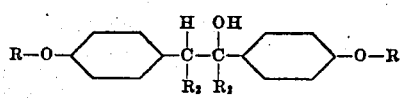

in which R in each case is a radical selected from the class consisting of alkyl radicals, aliphatic carboxylic acyl radicals, and aracyl radicals, and R₂ in each case is an alkyl radical.

3. The method of producing a disubstituted stilbene of predominantly "trans" form, which comprises subjecting to the presence of iodine, at a temperature between 70° C. and 140° C., a composition represented by the following formula:

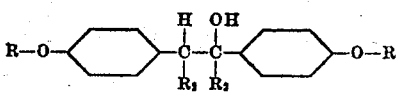

in which R in each case is a radical selected from the class consisting of alkyl radicals, aliphatic carboxylic acyl radicals, and aracyl radicals, and R₂ in each case is an alkyl radical.

4. The method of producing a disubstituted stilbene in predominantly "trans" form in accordance with claim 1, in which R is the methyl radical and R₂ is an alkyl radical.

5. The method of producing a disubstituted stilbene in the "trans" form, which comprises subjecting to the presence of iodine a composition in the "cis" form which is represented by the following formula:

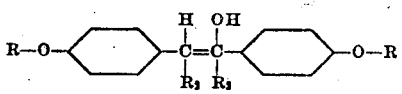

in which R in each case is a radical selected from the class consisting of alkyl radicals, aliphatic carboxylic acyl radicals, and aracyl radicals, and R₂ in each case is an alkyl radical.

6. The method of producing a disubstituted stilbene in the "trans" form, which comprises subjecting to the presence of iodine, at a temperature between 40° C. and 200° C., a composition in the "cis" form which is represented by the following formula:

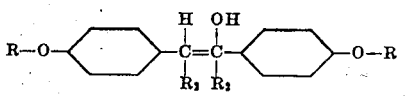

in which R in each case is a radical selected from the class consisting of alkyl radicals, aliphatic carboxylic acyl radicals, and aracyl radicals, and R₂ in each case is an alkyl radical.

7. The method of producing a disubstituted stilbene in the "trans" form, which comprises subjecting to the presence of iodine, at a temperature between 70° C. and 140° C., a composition in the "cis" form which is represented by the following formula:

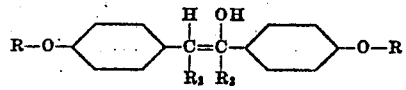

in which R in each case is a radical selected from the class consisting of alkyl radicals, aliphatic carboxylic acyl radicals, and aracyl radicals, and R₂ in each case is an alkyl radical.

8. The method of producing the "trans" form of 4:4'-dimethoxy-$\alpha,\beta$-diethyl stilbene, which comprises subjecting the "cis" form of 4:4'-dimethoxy-$\alpha,\beta$-diethyl stilbene to the presence of iodine.

9. The method of producing 4:4'-dimethoxy-$\alpha,\beta$-diethyl stilbene in predominantly "trans" form, which comprises subjecting 3:4-di-(p-methoxyphenyl)hexane-3-ol to the presence of iodine.

10. The method of producing a disubstituted stilbene in predominantly "trans" form which comprises subjecting to the presence of iodine, at a temperature between 70° C. and 140° C., a composition represented by the following formula:

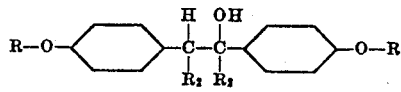

in which R in each case is a radical selected from the class consisting of alkyl radicals, aliphatic carboxylic acyl radicals, and aracyl radicals, and R₂ in each case is an alkyl radical, dissolving the resulting product in a solvent which is substantially nonmiscible with water, adding an aqueous solution of an alkali thiosulfate to the solution of said product in said solvent, and agitating and separating the substantially iodine-free product dissolved in said solvent from the said aqueous solution.

11. The method of producing a disubstituted stilbene in predominantly "trans" form, which comprises subjecting to the presence of iodine in a solvent a composition represented by the following formula:

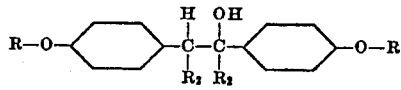

in which R in each case is a radical selected from the class consisting of alkyl radicals, aliphatic carboxylic acyl radicals, and aracyl radicals, and R₂ in each case is an alkyl radical.

12. The method of producing a disubstituted stilbene in predominantly "trans" form in accordance with claim 1, in which the amount of iodine employed is between .05 and .3 percent by weight of the composition treated.

13. The method of producing a disubstituted stilbene in the "trans" form in accordance with claim 5, in which the amount of iodine employed is between .05 and .3 percent by weight of the composition treated.

EWALD ROHRMANN.

2,346,049

Certificate of Correction

Patent No. 2,346,049      EWALD ROHRMANN      April 4, 1944.

It is hereby certified that errors appear in the printed specification of the above numbered patent requiring correction as follows: Page 4, first column, lines 50 and 64 and second column, line 8, claims 5, 6, and 7 respectively, for that portion of the formula reading "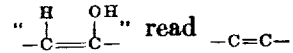" read $-C=C-$ and that the said Letters Patent should be read with these corrections therein that the same may conform to the record of the case in the Patent Office.

Signed and sealed this 26th day of September, A. D. 1944.

[SEAL]

LESLIE FRAZER,
*Acting Commissioner of Patents.*